(12) United States Patent
Adler et al.

(10) Patent No.: US 6,425,671 B1
(45) Date of Patent: Jul. 30, 2002

(54) OPTICAL MIRROR FLEXING STRUCTURE AND ASSEMBLY

(76) Inventors: Alan Adler, 752 La Para Ave., Palo Alto, CA (US) 93406; William Kelley, 2059 S. Arrowhead La., Cottonwood, AZ (US) 86326; Howard Moore, 1553 California Dr., Chino Valley, AZ (US) 86323

( * ) Notice: Subject to any disclaimer, the term of this patent is extended or adjusted under 35 U.S.C. 154(b) by 0 days.

(21) Appl. No.: 09/549,311

(22) Filed: Apr. 13, 2000

(51) Int. Cl.[7] .............................. G02B 5/08; G02B 7/182
(52) U.S. Cl. ..................... 359/846; 359/847; 359/872; 359/900
(58) Field of Search .................. 359/846, 847, 359/848, 849, 872, 900

(56) References Cited

U.S. PATENT DOCUMENTS

| | | | | |
|---|---|---|---|---|
| 1,685,032 A | * | 9/1928 | Parsons ................ | 359/849 |
| 3,514,776 A | * | 5/1970 | Mulready .............. | 359/849 |
| 3,610,738 A | * | 10/1971 | Bochmann ............. | 359/847 |
| 3,628,852 A | * | 12/1971 | Snaper ................. | 359/849 |
| 3,893,755 A | * | 7/1975 | Cobarg et al. ......... | 359/847 |
| 4,128,310 A | * | 12/1978 | Miller ................... | 359/847 |
| 4,288,146 A | * | 9/1981 | Johnson, Jr. et al. ... | 359/847 |
| 4,734,557 A | * | 3/1988 | Alfille et al. .......... | 359/849 |
| 5,016,998 A | * | 5/1991 | Butler et al. ........... | 359/847 |
| 5,210,653 A | * | 5/1993 | Schell .................. | 359/849 |
| 5,291,337 A | * | 3/1994 | Greger et al. .......... | 359/846 |
| 5,677,800 A | * | 10/1997 | Soll et al. ............. | 359/846 |
| 5,900,996 A | * | 5/1999 | Zadro .................. | 359/846 |

FOREIGN PATENT DOCUMENTS

GB          400445     * 10/1933 ............ 359/846

* cited by examiner

Primary Examiner—Ricky D. Shafer

(57) ABSTRACT

The present invention is a structure for holding and forming an optical mirror disc. A puller plate is attached to an elastic layer to the back surface of the mirror. A tensioner applies axial tension to the puller plate. A perimeter support engages the perimeter of the disc and reacts the axial tension into an axial compression force acting on the perimeter of the disc, flexing the disc into a desired shape.

6 Claims, 6 Drawing Sheets

OPTICAL MIRROR FLEXING STRUCTURE AND ASSEMBLY

SUMMARY

The present invention pertains to structures which flex spherical mirrors into precise aspheric shapes and mirror assemblies employing such structures.

PRIOR ART

In Sky and Telescope magazine, June 1992, one of the present inventors, William Kelley, described a method of pulling a spherical mirror into a rough approximation of a paraboloid with a central stud which was bonded to the back of the mirror.

Others have discussed warping mirrors into asymmetric shapes.

Still others have discussed deforming mirrors during the grinding process, then releasing them after grinding in order to achieve a desired shape.

THE PRESENT INVENTION

The present inventors have discovered new methods of flexing spherical mirrors to achieve highly accurate axisymmetric shapes such as paraboloids. These methods involve one or more of the following:

a. Pulling on a large diameter circular area of the mirror back.

b. Pulling on an annular area of the mirror back.

c. Pulling on a mirror with a puller attached to the mirror back via an elastic layer.

d. Pulling on a mirror having a tapered back surface.

THE DRAWINGS

Figure 1:
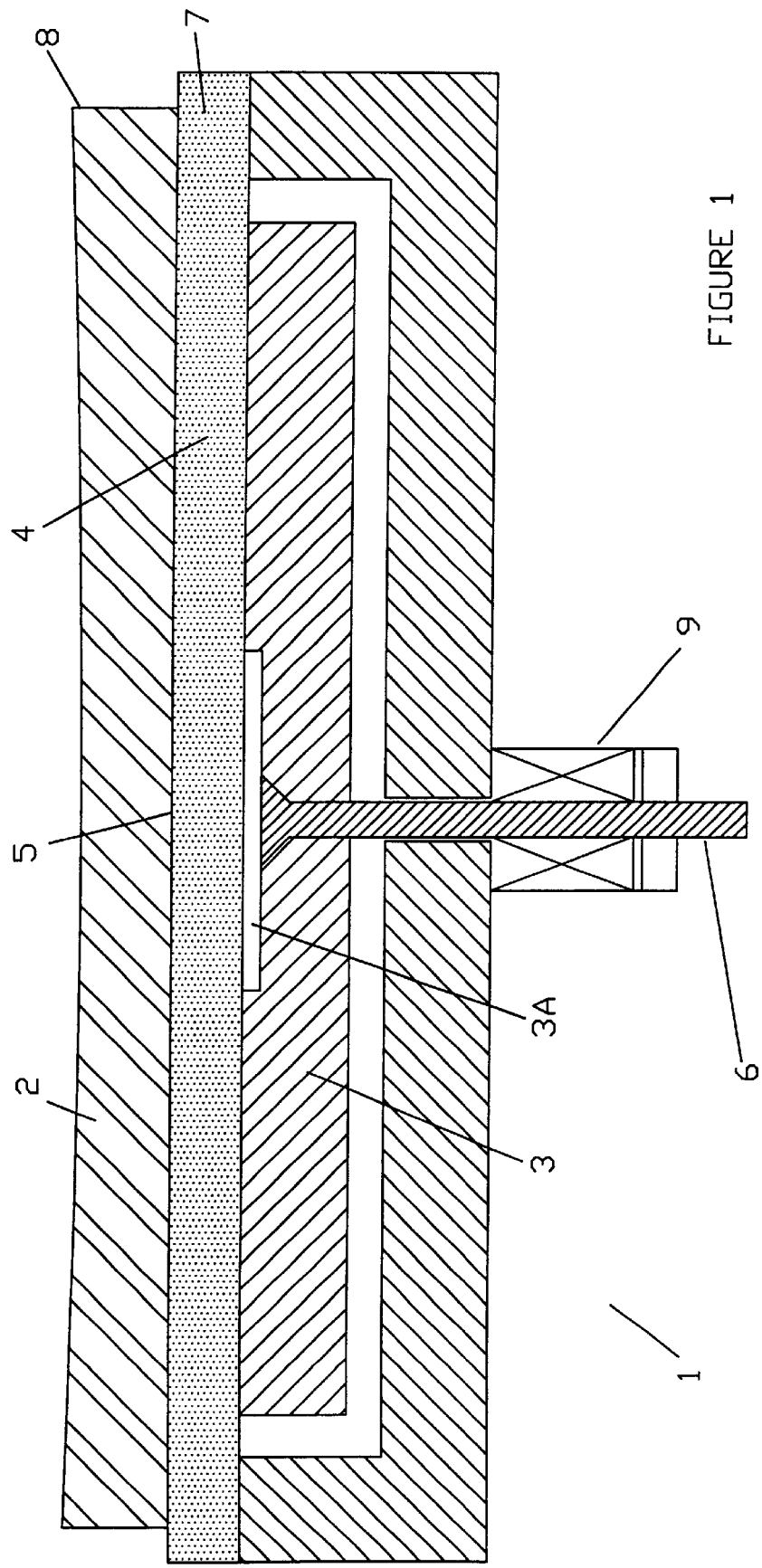
Figure 2:
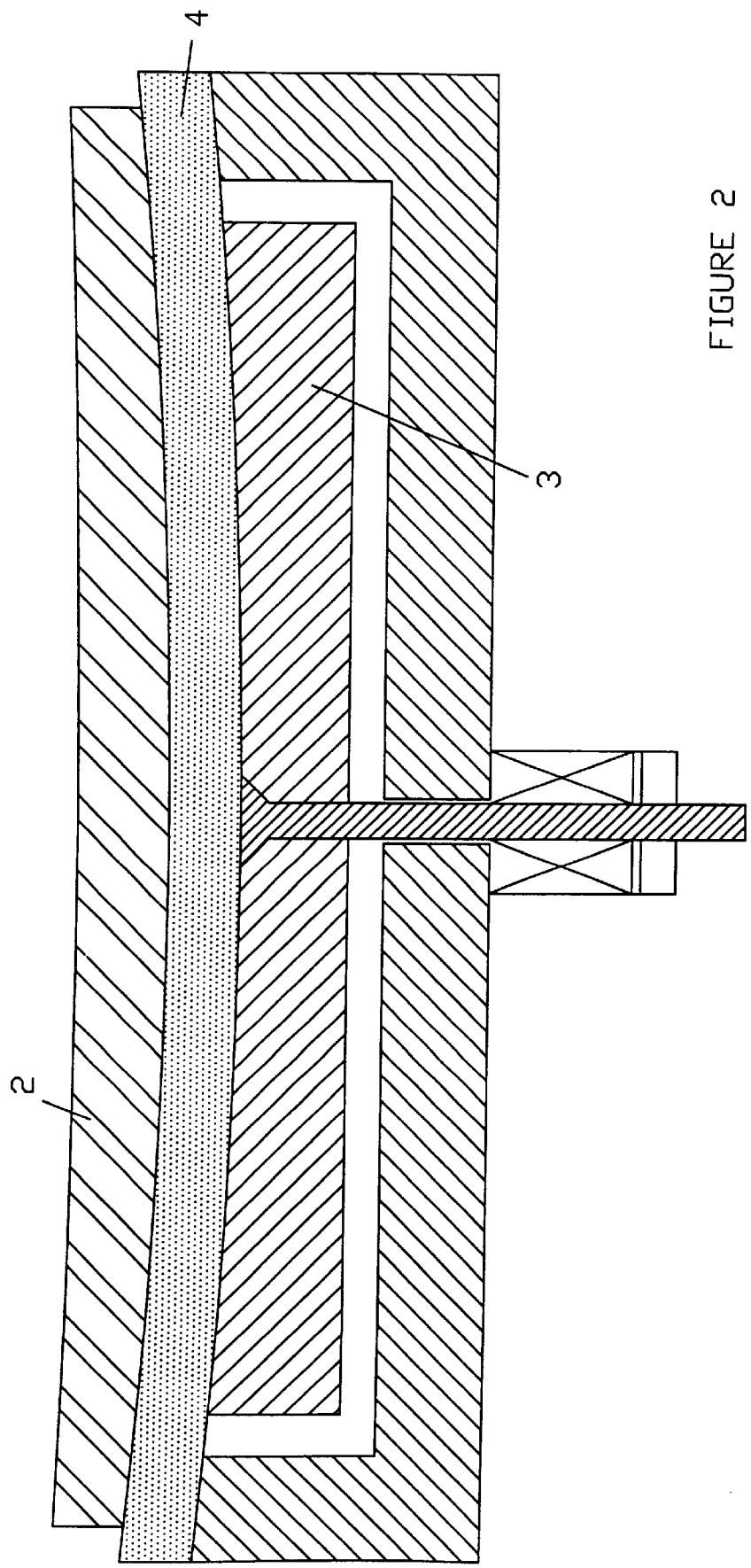
Figure 3:
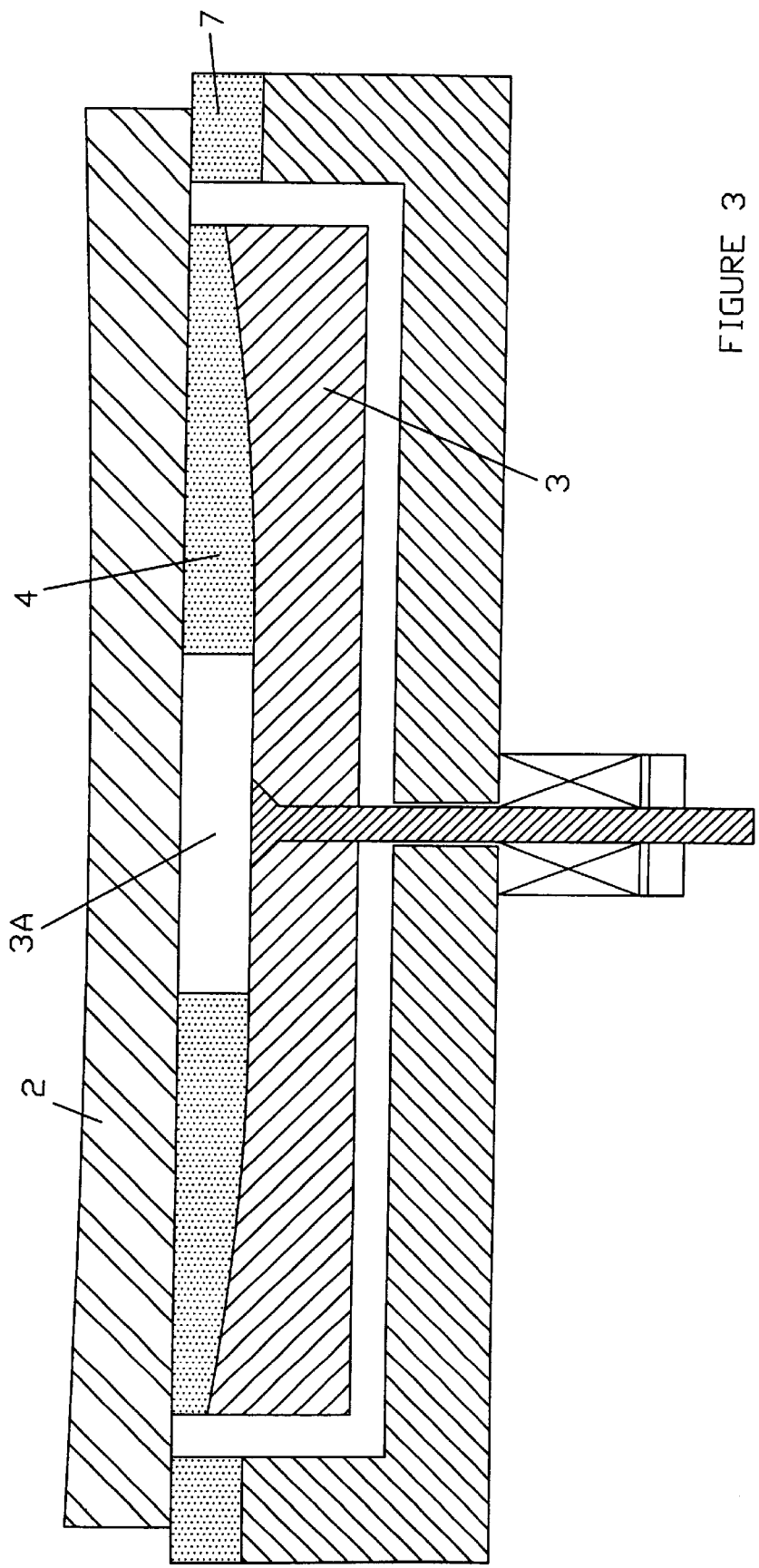
Figure 4:
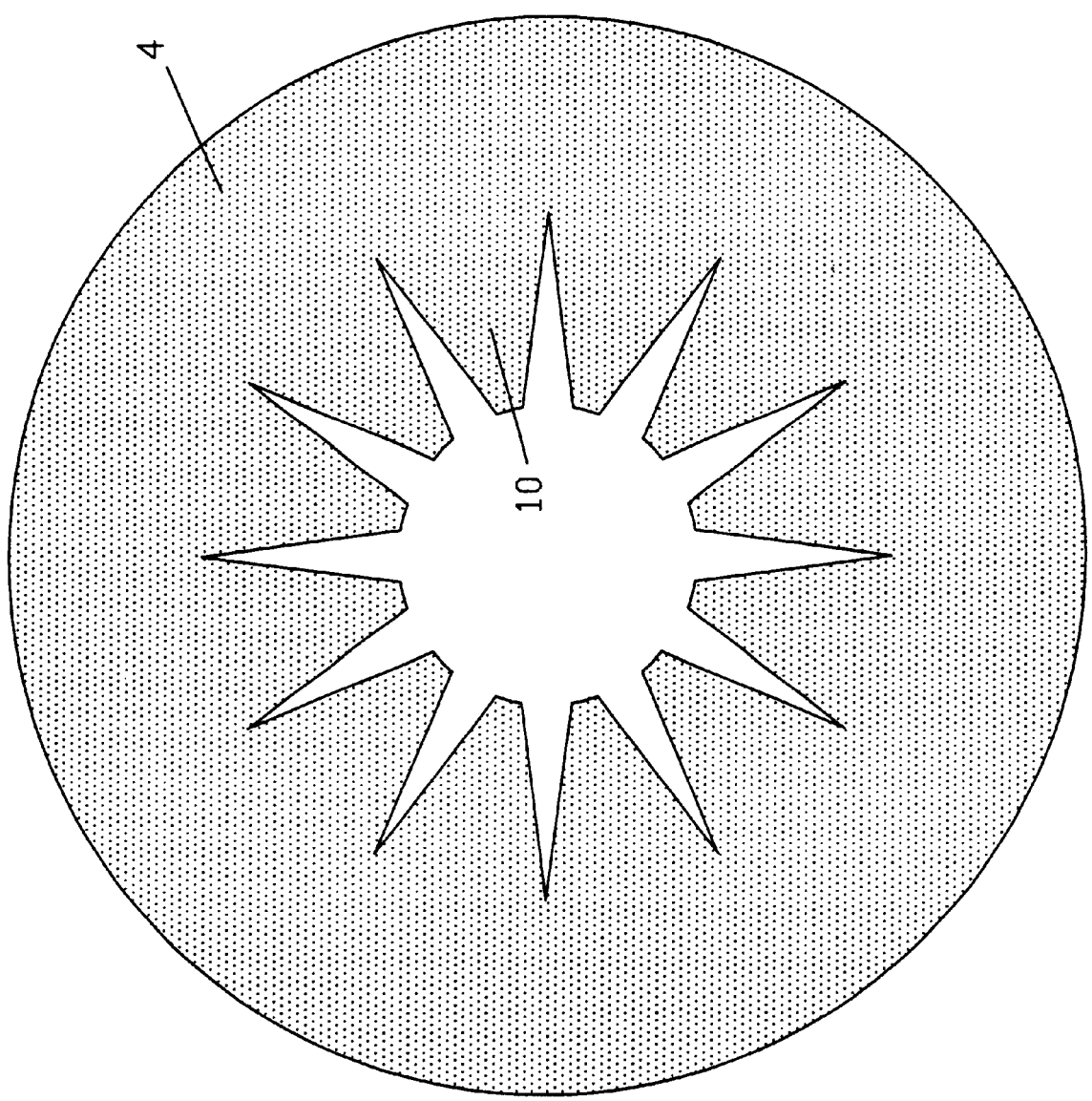
Figure 5:
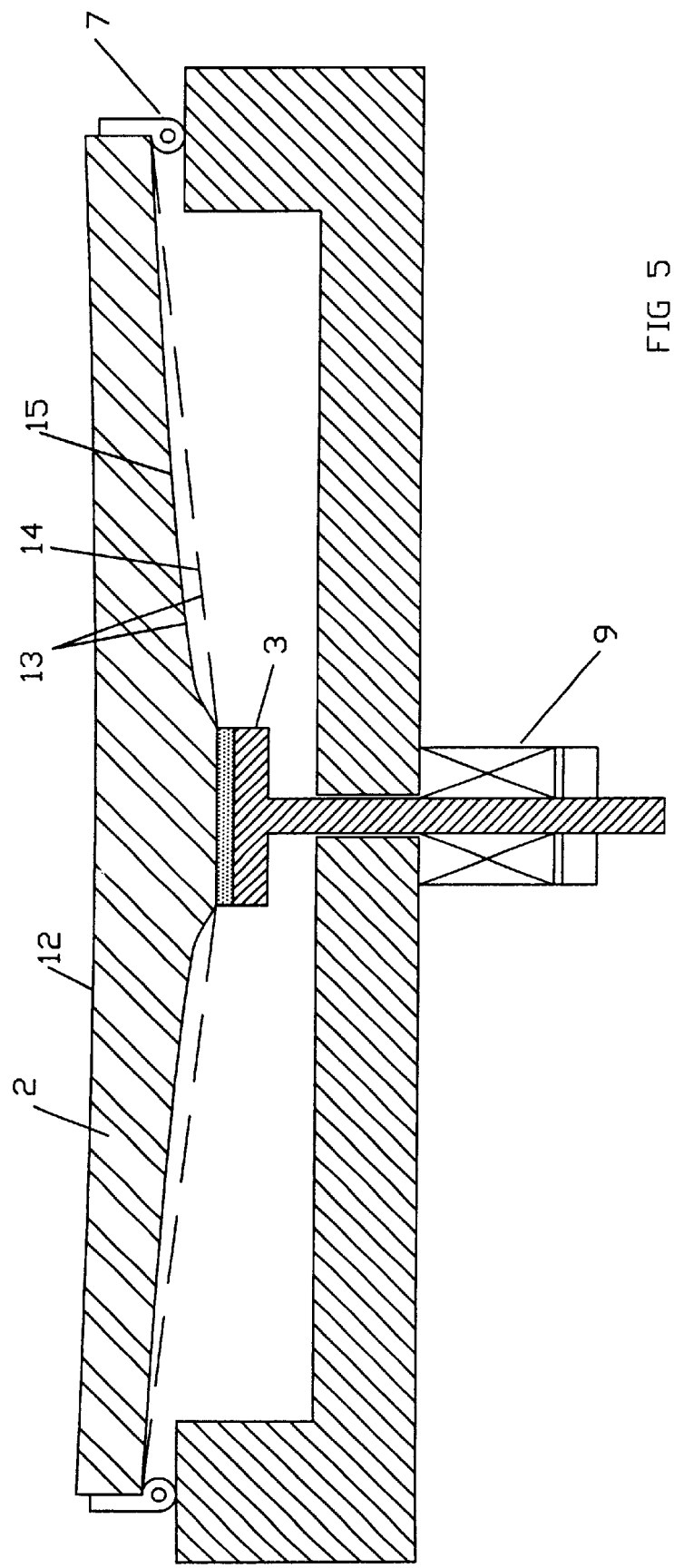
Figure 6:
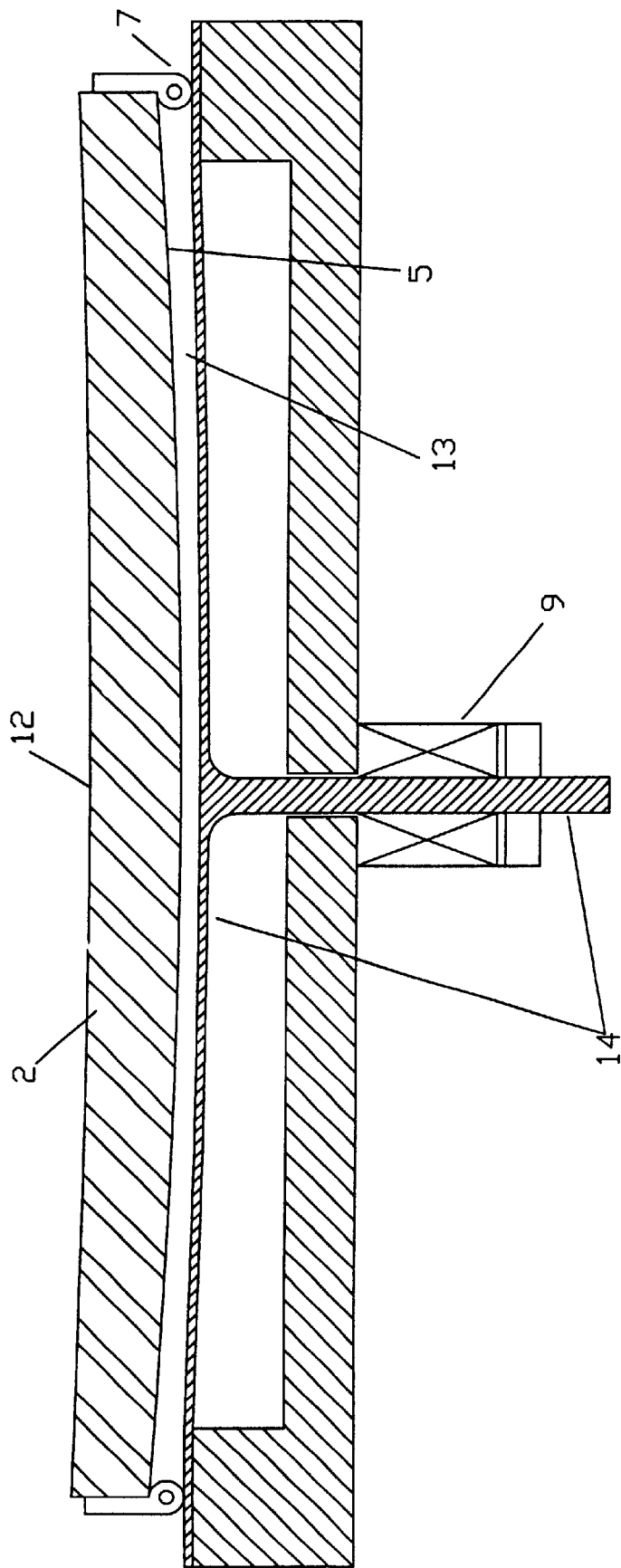

FIG. 1 illustrates the cross-section of a structure for holding a flexing a mirror. FIG. 2 shows an alternative to FIG. 1 in which the back surface of the mirror is convex. FIG. 3 shows another alternative to FIG. 1 in which the puller is coupled to the mirror with an elastic layer of varying thickness in order to vary the tension applied to certain zones of the mirror. FIG. 4 is a plan view of a puller having zones of reduced attachment area to reduce average tensions in these zones. FIG. 5 is a cross-section of an optical assembly having a mirror with a centrally attached puller and a conical back surface. FIG. 6 is a cross-section of an optical assembly employing a reduced pressure region to flex the mirror.

DETAILED DESCRIPTION OF THE INVENTION

Referring to FIG. 1, the invention comprises a structure 1 for holding and forming an optical mirror disc 2. A puller plate 3 is attached via layer 4 to the back surface 5 of the mirror. A tensioner 6 applies axial tension to the puller plate. A perimeter support 7 engages the perimeter of the disc and reacts the axial tension into an axial compression force acting on the perimeter of the disc, flexing the mirror disc into a desired optical shape.

Best results are achieved when the puller 3 engages the mirror though an elastic layer 4. This elastic layer can be rubber, foam, or elastic adhesive. It is best that the perimeter support 7 also engage the mirror through an elastic layer. In FIG. 1, layer 4 and perimeter support 7 are drawn as a single contiguous element. However they can be separate elements as illustrated in FIGS. 3 and 5.

In FIG. 1 puller plate 3 is relieved in the center region 3A. Thus the puller plate engages (via layer 4) an annular region on the back of the mirror disc. Alternative methods of achieving an annular engagement region are illustrated in FIGS. 3 and 4. Annular engagement regions have been found to produce fine paraboloids from flat backed spherical mirrors.

Note that the tensioner 6 is coupled to the structure through a spring 9 in order to stabilize the tension in the event of expansion or contraction of the components.

FIG. 2 shows an alternative to FIG. 1 in which the back surface 5 of the mirror is convex. This figure depicts a circular engagement area between the back of mirror 2 and elastic layer 4. Circular engagement areas can produce excellent paraboloids from convex backed spherical mirrors.

FIG. 3 shows another alternative to FIG. 1 in which the puller 3 engages the mirror via an elastic layer 4 having zones of varying thickness in order to vary the tension applied to corresponding zones of the mirror. This figure also shows an annular elastic layer 4 having a central opening 3A which results in an annular pull. This method of achieving an annular pull is an alternative to the relieved puller area 3A illustrated in FIG. 1.

FIG. 4 is a plan view of a puller having zones 10 of reduced attachment area with the mirror to reduce the average tensions applied to corresponding mirror zones.

The embodiments of the invention disclosed in FIGS. 2, 3 and 4 may employed individually or in combination to achieve a desired optical shape.

The embodiments of FIGS. 1 through 4 are applicable to mirrors having flat or convex back surfaces. To achieve a paraboloid with these embodiments, it is important that the puller engage the mirror over a region having an outside diameter of at least one fourth of the diameter of the mirror disc.

FIG. 5 is a cross-section of an optical assembly comprising a mirror disc 2 with a conical back surface 13 tapered to reduced thickness at the outer perimeter. In this embodiment the puller 3 is attached to the central region of the back surface of the mirror. The tensioner 6 applies axial tension to the puller. Again there is a perimeter support 7 engaging the perimeter of the disc and reacting the axial tension into an axial compression force acting on the perimeter of the disc and flexing the mirror disc into a desired optical shape.

The optical mirror assembly of FIG. 5 shows two alternative back tapered surfaces; linear taper 14 and sublinear taper 15. For purposes of this specification a sublinear taper is defined as a taper having a cross-sectional line which is concave inward (towards the front of the mirror) with respect to a linear (straight) line. A mirror assembly having sub-linear back taper can be formed to an excellent paraboloid when combined with a center pull.

In FIG. 5 the optical mirror assembly has a back surface with a flat untapered central region however the taper may also originate at the center.

FIG. 6 illustrates the cross-section on an optical mirror assembly comprising a mirror disc 2 with a convex back surface 5. An air-tight perimeter support 7 engages the perimeter of the disc and creates a reduced pressure region 13 behind the back surface. This illustration also shows an example of a device 14 for reducing the pressure of region 13 thus flexing the mirror disc into a desired optical shape. Device 14 in this example is a diaphragm and puller rod, however other devices could be employed to reduce the pressure in region 13 without departing from the spirit of the invention. Region 13 may contain gas, liquid, or an elastomeric gel.

The figures depict the perimeter support 7 engaging the back surface of the mirror. However as an alternative, the perimeter support can adhesively engage the outermost edge 8 of the mirror.

Example dimensions of a structure for holding and forming a mirror utilizing an annularly attached puller applied to a spherical mirror to flex it into a high quality paraboloid are listed below:

Mirror Diameter: 10"

Mirror Thickness: 1"

Focal Length: 60"

Annular Puller inside diameter: 1.5"

Annular Puller outside diameter: 8.5"

Puller Tension: 170 lbs.

Of course numerous dimensions and details could be changed in this and other embodiments without departing from the spirit of the invention as set forth in this specification and claims.

What is claimed is:

1. A structure for holding and forming an optical mirror disc comprising;

a puller attached to the back surface of the mirror engaging said mirror though an elastic layer over a region having an outside diameter of at least one fourth of the diameter of said mirror disc, a tensioner applying axial tension to the puller, a perimeter support engaging the perimeter of the mirror through an elastic layer and reacting said axial tension into an axial compression force acting on the perimeter of said mirror and flexing said mirror into a desired optical shape.

2. A structure as recited in claim 1 wherein said puller engages an annular region on the back of said mirror disc.

3. A structure as recited in claim 1 wherein the back surface of said mirror disc is convex.

4. A structure as recited in claim 1 wherein said puller has zones of reduced attachment area with said mirror to reduce the average tension applied to the corresponding zones of said mirror.

5. A structure as recited in claim 1 wherein said elastic layer has zones of varying thickness in order to vary the tension applied to corresponding zones of said mirror.

6. A structure as recited in claim 1 wherein said tensioner is coupled to said perimeter support through a spring in order to stabilize said axial tension.

\* \* \* \* \*